(12) United States Patent
Liang et al.

(10) Patent No.: US 10,407,052 B2
(45) Date of Patent: Sep. 10, 2019

(54) HYBRID TRANSMISSION MOTOR CONTROL FOR POWER-HOP AND ENGINE MOUNT LOAD REDUCTION USING TORSIONAL VIBRATION RESONANCE MODE

(71) Applicants: Yang Liang, Troy, MI (US); Zhe Li, Rochester Hills, MI (US); Jaspal S Sandhu, West Bloomfield, MI (US)

(72) Inventors: Yang Liang, Troy, MI (US); Zhe Li, Rochester Hills, MI (US); Jaspal S Sandhu, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 102 days.

(21) Appl. No.: 15/837,085

(22) Filed: Dec. 11, 2017

(65) Prior Publication Data

US 2019/0176804 A1    Jun. 13, 2019

(51) Int. Cl.
*B60W 20/15*      (2016.01)
*B60W 50/00*      (2006.01)
*B60W 30/20*      (2006.01)
*B60W 10/08*      (2006.01)

(52) U.S. Cl.
CPC ............ *B60W 20/15* (2016.01); *B60W 10/08* (2013.01); *B60W 30/20* (2013.01); *B60W 50/00* (2013.01); *B60W 2050/0011* (2013.01); *B60W 2510/0604* (2013.01); *B60W 2510/081* (2013.01); *B60W 2510/1055* (2013.01); *B60W 2510/18* (2013.01); *B60W 2520/105* (2013.01); *B60W 2520/26* (2013.01); *B60W 2540/10* (2013.01); *B60W 2710/083* (2013.01); *B60Y 2200/92* (2013.01); *Y10S 903/903* (2013.01)

(58) Field of Classification Search
None
See application file for complete search history.

(56) References Cited

U.S. PATENT DOCUMENTS

| 5,537,957 | A  | 7/1996  | Tashiro et al. |
| 7,121,975 | B2 | 10/2006 | Tomura et al. |
| 7,292,917 | B2 | 11/2007 | Kuang et al. |
| 2003/0183467 | A1 | 10/2003 | Kozarekar |
| 2018/0201251 | A1* | 7/2018 | Imamura ................ B60K 6/445 |
| 2018/0208178 | A1* | 7/2018 | Owen ............... B60W 50/0097 |

FOREIGN PATENT DOCUMENTS

JP    2009067216 A    4/2009

* cited by examiner

*Primary Examiner* — Richard M Camby
(74) *Attorney, Agent, or Firm* — Ralph E. Smith

(57) ABSTRACT

A control system for a hybrid transmission of a vehicle, the hybrid transmission having first and second electric motors, comprises a motor speed sensor configured to measure a rotational speed of the first electric motor and a controller. The controller is configured to determine a first difference between a first measured speed and a first expected speed of the first electric motor, when the first difference exceeds a speed threshold indicative of tire slippage, temporarily adjust a torque output of the second electric motor to compensate for an oscillation generated by the first electric motor, after controlling the second electric motor to temporarily adjust its torque output, determine a second difference between a second measured speed and a second expected speed of the first electric motor, and when the second difference does not exceed the speed threshold, control the second electric motor based on a driver torque request.

20 Claims, 4 Drawing Sheets

HYBRID TRANSMISSION MOTOR CONTROL FOR POWER-HOP AND ENGINE MOUNT LOAD REDUCTION USING TORSIONAL VIBRATION RESONANCE MODE

FIELD

The present application generally relates to hybrid transmission motor control and, more particularly, to vehicle stability control (VSC) techniques for vehicles having a dual electric motor hybrid transmission.

BACKGROUND

A vehicle comprises a powertrain that generates drive torque to propel the vehicle. Tire slippage occurs when the tires of the vehicle temporarily lose traction with a ground surface. Example conditions where tire slippage occurs are rough/uneven road and slippery/wet road conditions. When tire slippage occurs, the torsional resonance of rotating drivelines/half shafts of the vehicle causes oscillations. These low frequency oscillations are perceived as noise/vibration/harshness (NVH) that is unpleasant for the driver. Vehicle stability control (VSC) systems (also known as electronic or dynamic stability control systems) exist that attempt to prevent or mitigate NVH caused by high frequency oscillations. One example scenario where conventional VSC systems operate is a loss of steering, after which the VSC system applies the vehicle's brakes. Accordingly, while such VSC systems work well for their intended purpose, there remains a need for improvement in the relevant art.

SUMMARY

According to one aspect of the invention, a control system for a hybrid transmission of a hybrid powertrain of a vehicle, the hybrid transmission having first and second electric motors, is presented. In one exemplary implementation, the control system comprises: a motor speed sensor configured to measure a rotational speed of the first electric motor; and a controller configured to: determine a first difference between a first measured speed and a first expected speed of the first electric motor; when the first difference exceeds a speed threshold indicative of tire slippage, temporarily adjust a torque output of the second electric motor to compensate for an oscillation generated by the first electric motor; after controlling the second electric motor to temporarily adjust its torque output, determine a second difference between a second measured speed and a second expected speed of the first electric motor; and when the second difference does not exceed the speed threshold, control the second electric motor based on a driver torque request.

In some implementations, the controller is further configured to detect a precondition of a level of acceleration satisfying an acceleration threshold. In some implementations, the acceleration threshold is a change in torque output of the hybrid powertrain or a rate of acceleration of the vehicle corresponding to wide-open throttle (WOT). In some implementations, the controller is configured to temporarily decrease the torque output of the second electric motor from a desired level based on the driver torque request. In some implementations, the controller is configured to gradually increase the torque output of the second electric motor to the desired level over a period.

In some implementations, the controller is further configured to detect a precondition of a level of braking satisfying a braking threshold. In some implementations, the braking threshold is a level of deceleration of the vehicle corresponding to an emergency or panic stop event. In some implementations, the controller is configured to temporarily perform closed-loop control of the torque output of the second electric motor. In some implementations, the closed-loop control is proportional-integral-derivative (PID) control.

In some implementations, the first electric motor is connected to a crankshaft of an engine of the vehicle and a driveline of the vehicle via a planetary gear set; the second electric motor is connected to the planetary gear set and to the driveline; and the controller controls the second electric motor to adjust its torque output to achieve a target torsional resonance that causes oscillations of the first and second electric motors that are 180 degrees out of phase thereby canceling each other.

According to another aspect of the invention, a vehicle stability control (VSC) method for a hybrid powertrain of a vehicle having a hybrid transmission including first and second electric motors, is presented. In one exemplary implementation, the method comprises: receiving, by a control system and from a motor speed sensor, a rotational speed of the first electric motor; determining, by the control system, a first difference between a first measured speed and a first expected speed of the first electric motor; when the first difference exceeds a speed threshold indicative of tire slippage, temporarily adjusting, by the control system, a torque output of the second electric motor to compensate for an oscillation generated by the first electric motor; after controlling the second electric motor to temporarily adjust its torque output, determining, by the control system, a second difference between a second measured speed and a second expected speed of the first electric motor; and when the second difference does not exceed the speed threshold, controlling, by the control system, the second electric motor based on a driver torque request.

In some implementations, the method further comprises detecting, by the control system, a precondition of a level of acceleration satisfying an acceleration threshold. In some implementations, the acceleration threshold is a change in torque output of the hybrid powertrain or a rate of acceleration of the vehicle corresponding to wide-open throttle (WOT). In some implementations, the method further comprises temporarily decreasing, by the control system, the torque output of the second electric motor from a desired level based on the driver torque request. In some implementations, the method further comprises gradually increasing, by the control system, the torque output of the second electric motor to the desired level over a period.

In some implementations, the method further comprises detecting, by the control system, a precondition of a level of braking satisfying a braking threshold. In some implementations, the braking threshold is a level of deceleration of the vehicle corresponding to an emergency or panic stop event. In some implementations, the method further comprises temporarily performing, by the control system, closed-loop control of the torque output of the second electric motor. In some implementations, the closed-loop control is proportional-integral-derivative (PID) control.

In some implementations, the first electric motor is connected to a crankshaft of an engine of the vehicle and a driveline of the vehicle via a planetary gear set; the second electric motor is connected to the planetary gear set and to the driveline; and the controller controls the second electric motor to adjust its torque output to achieve a target torsional resonance that causes oscillations of the first and second electric motors that are 180 degrees out of phase thereby canceling each other.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As mentioned above, torsional resonance of rotating drivelines/half shafts of a vehicle causes oscillations or noise/vibration/harshness (NVH) that is noticeable to a driver. This occurs particularly during tire slippage conditions. One specific type of vehicle includes a hybrid transmission comprising two electric motors that receive an input drive torque from an engine and work in conjunction to output a desired final drive torque. More specifically, the first electric motor is connected to the engine's crankshaft and to a driveline via a planetary gear set, whereas the second electric motor is connected to both the driveline and the planetary gear set. The oscillations in this type of system are very low frequency (e.g., a few hertz) with high amplitudes, whereas the oscillations that conventional VSC systems aim to prevent are very high frequency with low amplitudes. Accordingly, VSC techniques are presented herein for such a dual electric motor hybrid transmission. These techniques utilize motor speed sensors that measure a rotational speed of the first and second electric motors (Motors A and B).

The techniques also utilize a controller that receives the measured speeds and compares a difference between one of the measured speeds (e.g., Motor A) and an expected speed to a speed threshold. This speed threshold is indicative of tire slippage. An optional precondition could be implemented where acceleration or brake force exceeds a threshold. Examples of this precondition could include wide open throttle (WOT) acceleration and an emergency or panic stop event. When the difference exceeds the speed threshold, the controller could temporarily reduce the torque output of the other electric motor (e.g., Motor B) from a desired torque output of the other electric motor based on a torque request (e.g., for a WOT acceleration event). Alternatively, the controller could temporarily perform closed-loop (e.g., proportional-integral-derivative, or PID) control of the torque output of the other electric motor (e.g., for an emergency or panic stop event). The difference between the measured and expected speeds is then recalculated and compared to the threshold. Once the threshold is satisfied, the controller returns the torque output of the electric motor to the desired torque.

Figure 1:
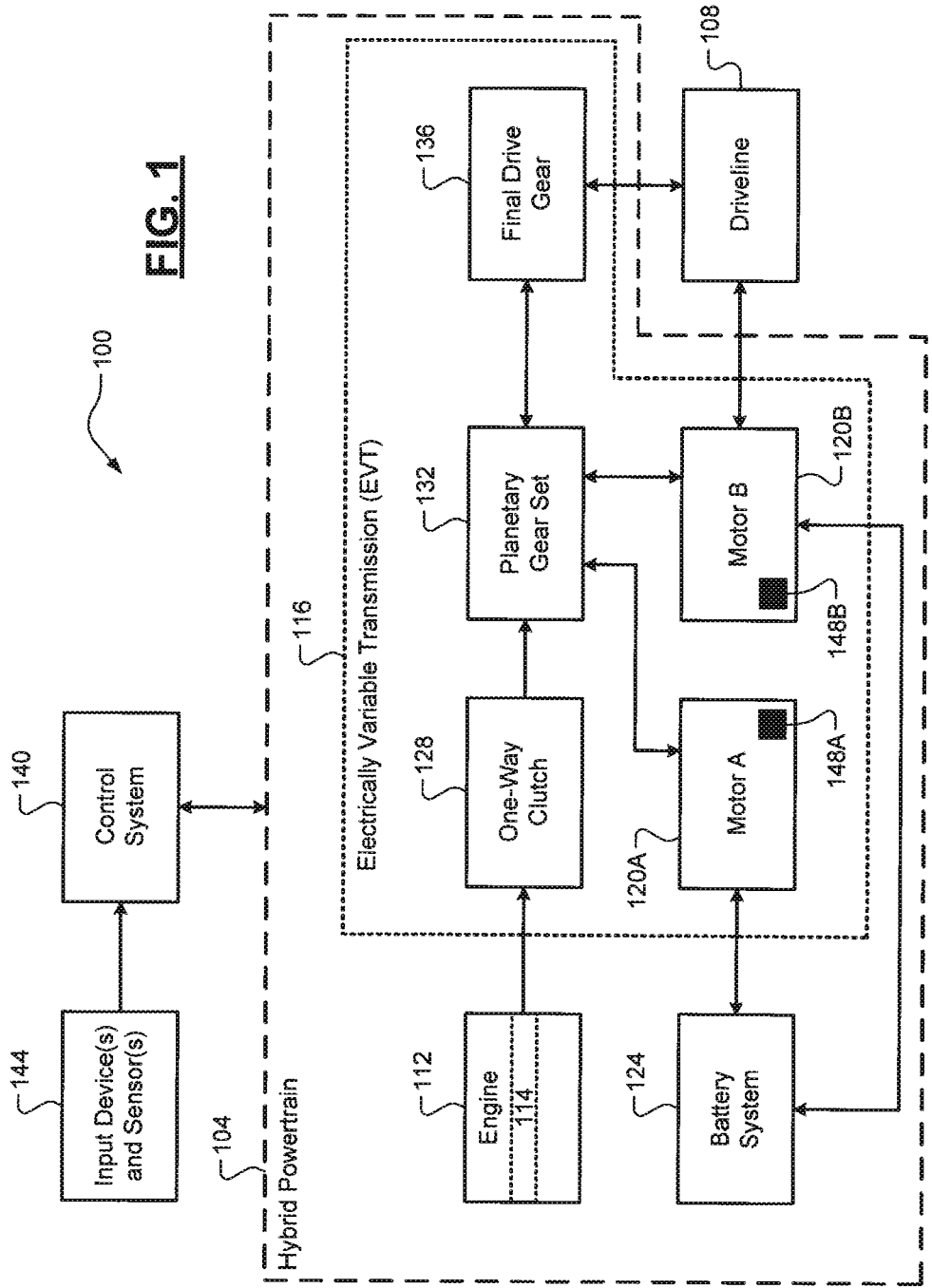
FIG. 1 is a functional block diagram of an example hybrid vehicle according to the principles of the present disclosure.

Referring now to FIG. 1, a functional block diagram of a hybrid vehicle 100 is illustrated. The hybrid vehicle 100 (also referred to as "vehicle 100") includes a hybrid powertrain 104 that provides torque to a driveline 108 (a differential, wheels, etc.). In the illustrated exemplary implementation, the hybrid powertrain 104 comprises an internal combustion engine 112 (also referred to as "engine 112") and a hybrid or electrically variable transmission (EVT) 116. In one exemplary implementation, the engine 112 is an Atkinson cycle engine having a compression ratio of approximately 12.5:1. This type of engine 112 is able to utilize a maximum amount of power generated by combustion of an air/fuel mixture, thereby increasing performance of the hybrid vehicle 100. One drawback of this type of engine 112 is poor power/performance at low speeds. The EVT 116, however, is able to generate drive torque to compensate for the poor power/performance of the engine 112, particularly at low speeds.

Figure 2:
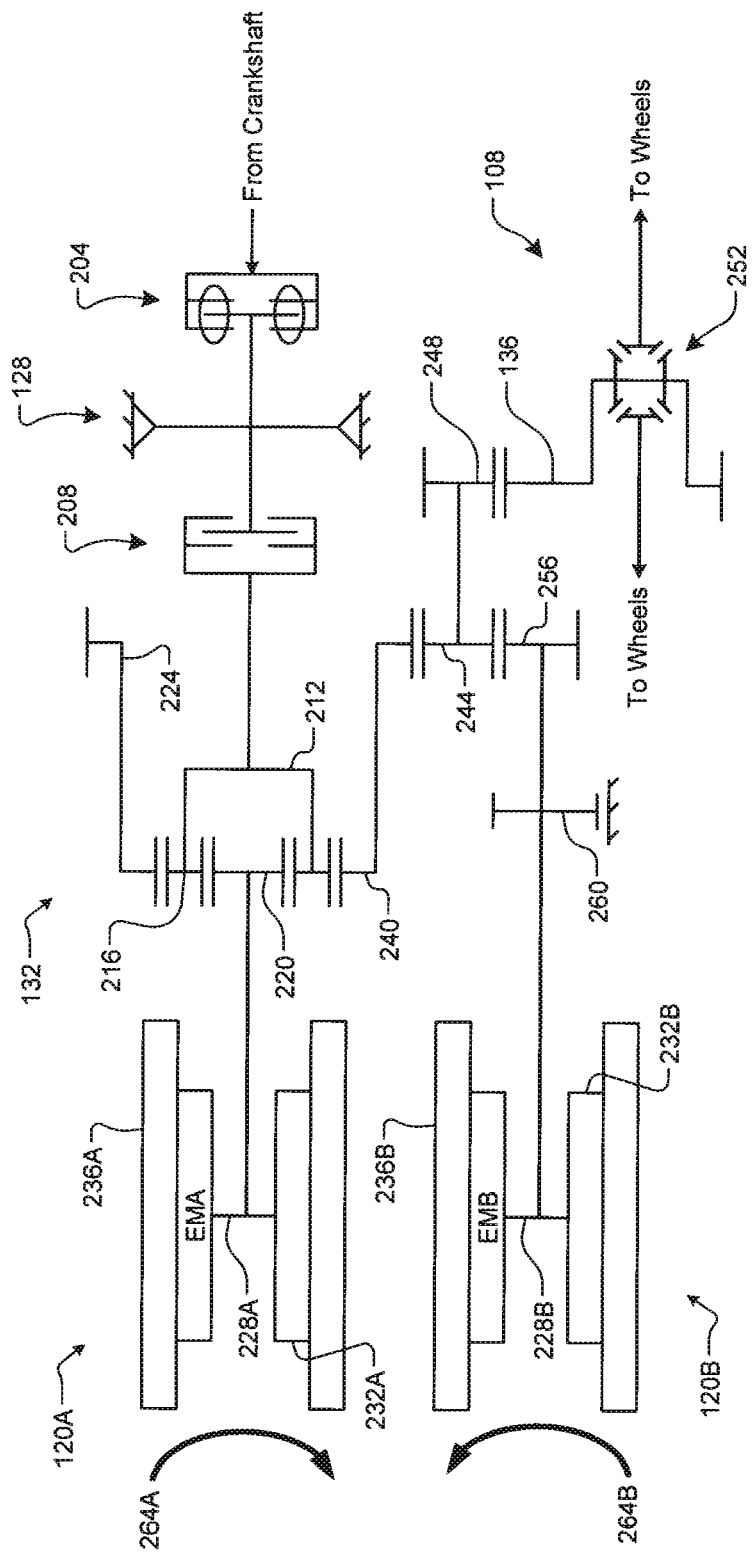
FIG. 2 is a schematic diagram of an example dual electric motor hybrid transmission according to the principles of the present disclosure.

The EVT 116 comprises first and second electric motors 120A, 120B ("electric motors 120") powered by a battery system 124. The EVT 116 further comprises a one-way clutch 128, a planetary gear set 132, and a final drive gear 136. The engine 112 is selectively connected to the planetary gear set 132 via the one-way clutch 128. Electric motor 120A is also connected to the planetary gear set 132, which in turn is connected to the driveline 108 via the final drive gear 136. Electric motor 120B is connected to both the planetary gear set 132 and directly to the driveline 108 such that the electric motors 120A, 120B and the planetary gear set 132 are able to achieve a wide range of gear ratios. Details of this planetary gear set 132 are shown in FIG. 2 and discussed in greater detail below. The electric motors 120A, 120B are also configured to recharge the battery system 124 (e.g., via regenerative braking).

A control system 140 controls operation of the hybrid powertrain 104. This includes, but is not limited to, controlling combinations of the engine 112 and the one-way clutch 128 and the electric motors 120A, 120B to achieve a desired torque output and a desired gear ratio of the EVT 116. The control system 140 receives inputs from a set of input devices and/or sensors 144. Non-limiting examples of these input device(s)/sensor(s) 144 include an accelerator pedal that provides a driver torque request, a key-on/key-off sensor for powering on/off the hybrid powertrain 104, motor speed sensors (specifically shown as 148A and 148B), battery system state sensors, and the like. The control system 140 is also referred to herein as a controller, but it will be appreciated that the vehicle 100 could include a plurality of different controllers for controlling different components (an engine controller, a transmission controller, etc.)

Referring now to FIG. 2, a schematic diagram of the EVT 116 is illustrated. The EVT 116 receives drive torque from the crankshaft 114 of the engine 112. A flywheel and damper 204 is connected to the crankshaft 114 and the one-way clutch 128. A torque limiting or breakaway clutch 208 is connected to the one-way clutch 128 and a carrier gear 212 of the planetary gear set 132. The planetary gear set 132 further comprises a pinion gear 216, a sun gear 220, and a main shaft gear 224. The sun gear 220 is connected to a shaft 228A of the first electric motor (EMA) 120A. The first electric motor 120A further comprises a rotor 232A that is magnetically driven by an alternating current applied to a stator 236B. The motor speed sensor 148, for example, measures the rotational speed of this shaft 228A or the rotor 232A. The planetary gear set 132 further comprises a ring gear 240 connected to the pinion gear 216 and a separate transfer/idler gear 244.

A final drive pinion gear 248 is connected to the transfer/idler gear 244 and the final drive gear 136. The final drive gear 136 is also connected to a differential 252 that splits the final driveshaft torque to the wheels of the driveline 108. The transfer/idler gear 244 is also connected to a pinion gear 256. A park clutch 260 is connected to the pinion gear and a shaft 228 of the second electric motor (EMB) 120B. Similar to the first electric motor 120A, the second electric motor 120B further comprises a rotor 232B that is magnetically driven by an alternating current applied to a stator 2366. As shown by arrows 264A and 264B, a target torsional vibration frequency for the EVT 116 could be to causes oscillations at the electric motors 120A, 120B that are 180 degrees out of phase with each other, thereby canceling each other out.

Figure 3A:
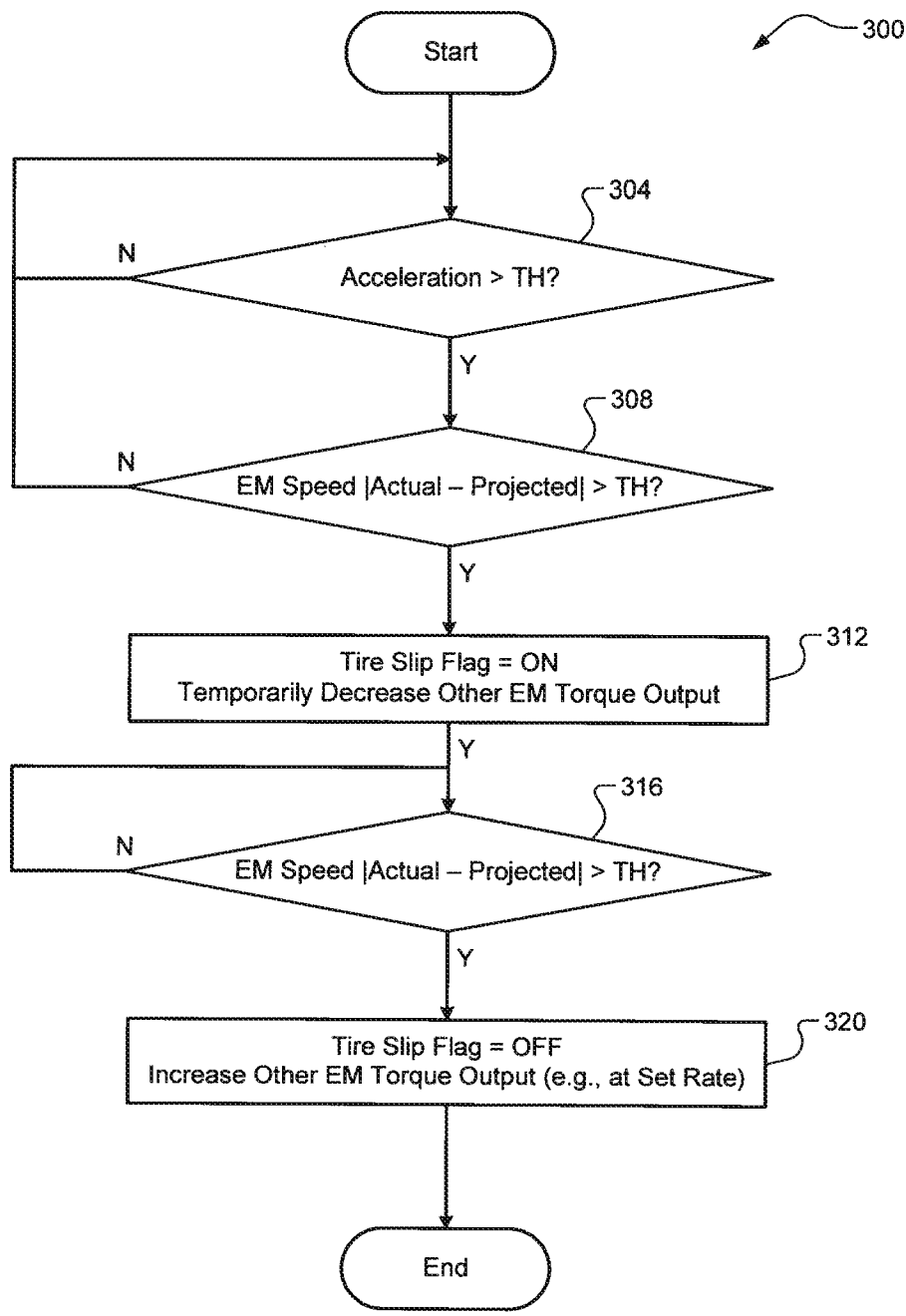
FIG. 3A is a flow diagram of a first example vehicle stability control (VSC) method according to the principles of the present disclosure.

Referring now to FIG. 3A, a flow diagram of a first example VSC method 300 for a vehicle having a dual electric motor hybrid transmission (e.g., EVT 116) is illustrated. At optional 304, the control system 140 determines whether a level of acceleration satisfies an acceleration threshold (TH). This could be, for example, a WOT acceleration event. Non-limiting examples of the level of acceleration include, but are not limited to, a change in torque output of the hybrid powertrain 104 and a rate of acceleration of the vehicle 100. If true, the method 300 proceeds to 308. Otherwise, the method 300 ends or returns to 304. At 308, the control system 140 determines whether a magnitude of a difference between the actual speed of one of the electric motors 120A and 120B (measured by its respective motor speed sensor 148A or 148B) and an expected or projected speed of the exceeds a speed threshold. This speed threshold could be indicative, for example, of tire slippage. The expected or projected speed could be modeled, for example, based on accelerator pedal input and vehicle weight. If true, the method 300 proceeds to 312. Otherwise, the method 300 ends or returns to 304.

At 312, the control system 140 sets a tire slip flag to ON or TRUE and controls the other of the first and second electric motors 120A and 120B to temporarily decrease its output torque, e.g., from a desired torque based on a driver torque request. At 316, the control system 140 determines whether a magnitude of a difference between the actual speed of the initially monitored electric motor 120A or 120B (measured by its respective motor speed sensor 148A or 148B) and the expected or projected speed exceeds a speed threshold (e.g., similar to operation 308). If true, the method 300 proceeds to 320. Otherwise, the method 300 returns to 316. It will be appreciated that the method 300 could alternatively return to 312 where output torque of the other of the first and second electric motors 120A and 120B could be further decreased. At 320, the control system 140 sets the tire slip flag to OFF or FALSE and controls the other of the first and second electric motors 120A and 120B to increase its output torque, e.g., to a desired torque based on the driver's torque request. In one exemplary implementation, this torque increase is gradually performed at a set rate such that it will be less noticeable to the driver. The method 300 then ends or returns to 304 for another cycle.

Figure 3B:
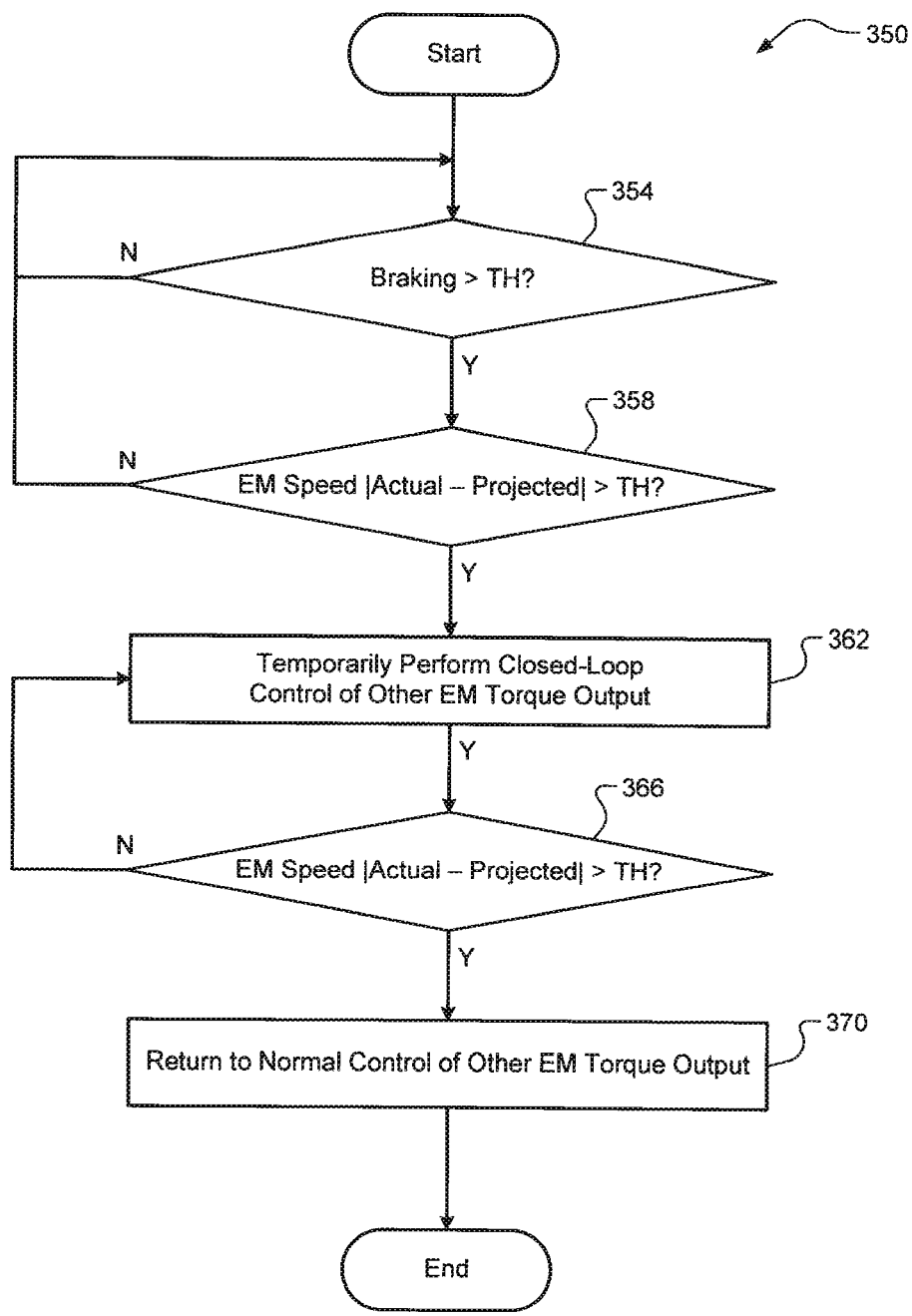
FIG. 3B is a flow diagram of a second example VSC method according to the principles of the present disclosure.

Referring now to FIG. 3B, a flow diagram of a second example VSC method 350 for a vehicle having a dual electric motor hybrid transmission (e.g., EVT 116) is illustrated. At optional 354, the control system 140 determines whether a level of braking satisfies a braking threshold (TH). This could be, for example, an emergency or panic stop event. One non-limiting examples of the level of braking is a rate of deceleration of the vehicle 100. If true, the method 350 proceeds to 358. Otherwise, the method 350 ends or returns to 354. At 358, the control system 140 determines whether a magnitude of a difference between the actual speed of one of the electric motors 120A and 120B (measured by its respective motor speed sensor 148A or 148B) and an expected or projected speed of the exceeds a speed threshold (e.g., indicative of tire slippage).

The expected or projected speed could be modeled, for example, based on accelerator pedal input and vehicle weight. If true, the method 350 proceeds to 362. Otherwise, the method 350 ends or returns to 354. At 362, the control system 140 temporarily performs closed-loop (e.g., PID) control for the torque output of the other of the first and second electric motors 120A and 120B. At 366, the control system 140 determines whether a magnitude of a difference between the actual speed of the initially monitored electric motor 120A or 120B (measured by its respective motor speed sensor 148A or 148B) and the expected or projected speed exceeds a speed threshold (e.g., similar to operation 358). If true, the method 350 proceeds to 370. Otherwise, the method 300 returns to 362. At 370, the control system 140 returns to normal control of the other of the first and second electric motors 120A and 120B. The method 350 then ends or returns to 354 for another cycle.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a hybrid transmission of a hybrid powertrain of a vehicle, the hybrid transmission having first and second electric motors, the control system comprising:
    a motor speed sensor configured to measure a rotational speed of the first electric motor; and
    a controller configured to:
        determine a first difference between a first measured speed and a first expected speed of the first electric motor;
        when the first difference exceeds a speed threshold indicative of tire slippage, temporarily adjust a torque output of the second electric motor to compensate for an oscillation generated by the first electric motor;
        after controlling the second electric motor to temporarily adjust its torque output, determine a second difference between a second measured speed and a second expected speed of the first electric motor; and when the second difference does not exceed the speed threshold, control the second electric motor based on a driver torque request.

2. The control system of claim 1, wherein the controller is further configured to detect a precondition of a level of acceleration satisfying an acceleration threshold.

3. The control system of claim 2, wherein the acceleration threshold is a change in torque output of the hybrid powertrain or a rate of acceleration of the vehicle corresponding to wide-open throttle (WOT).

4. The control system of claim 2, wherein the controller is configured to temporarily decrease the torque output of the second electric motor from a desired level based on the driver torque request.

5. The control system of claim 4, wherein the controller is configured to gradually increase the torque output of the second electric motor to the desired level over a period.

6. The control system of claim 1, wherein the controller is further configured to detect a precondition of a level of braking satisfying a braking threshold.

7. The control system of claim 6, wherein the braking threshold is a level of deceleration of the vehicle corresponding to an emergency or panic stop event.

8. The control system of claim 6, wherein the controller is configured to temporarily perform closed-loop control of the torque output of the second electric motor.

9. The control system of claim 8, wherein the closed-loop control is proportional-integral-derivative (PID) control.

10. The control system of claim 1, wherein:
the first electric motor is connected to a crankshaft of an engine of the vehicle and a driveline of the vehicle via a planetary gear set;
the second electric motor is connected to the planetary gear set and to the driveline; and
the controller controls the second electric motor to adjust its torque output to achieve a target torsional resonance that causes oscillations of the first and second electric motors that are 180 degrees out of phase thereby canceling each other.

11. A vehicle stability control (VSC) method for a hybrid powertrain of a vehicle having a hybrid transmission including first and second electric motors, the method comprising:
receiving, by a control system and from a motor speed sensor, a rotational speed of the first electric motor;
determining, by the control system, a first difference between a first measured speed and a first expected speed of the first electric motor;
when the first difference exceeds a speed threshold indicative of tire slippage, temporarily adjusting, by the control system, a torque output of the second electric motor to compensate for an oscillation generated by the first electric motor;
after controlling the second electric motor to temporarily adjust its torque output, determining, by the control system, a second difference between a second measured speed and a second expected speed of the first electric motor; and
when the second difference does not exceed the speed threshold, controlling, by the control system, the second electric motor based on a driver torque request.

12. The method of claim 11, further comprising detecting, by the control system, a precondition of a level of acceleration satisfying an acceleration threshold.

13. The method of claim 12, wherein the acceleration threshold is a change in torque output of the hybrid powertrain or a rate of acceleration of the vehicle corresponding to wide-open throttle (WOT).

14. The method of claim 12, further comprising temporarily decreasing, by the control system, the torque output of the second electric motor from a desired level based on the driver torque request.

15. The method of claim 14, further comprising gradually increasing, by the control system, the torque output of the second electric motor to the desired level over a period.

16. The method of claim 11, further comprising detecting, by the control system, a precondition of a level of braking satisfying a braking threshold.

17. The method of claim 16, wherein the braking threshold is a level of deceleration of the vehicle corresponding to an emergency or panic stop event.

18. The method of claim 16, further comprising temporarily performing, by the control system, closed-loop control of the torque output of the second electric motor.

19. The method of claim 18, wherein the closed-loop control is proportional-integral-derivative (PID) control.

20. The method of claim 11, wherein:
the first electric motor is connected to a crankshaft of an engine of the vehicle and a driveline of the vehicle via a planetary gear set;
the second electric motor is connected to the planetary gear set and to the driveline; and
the controller controls the second electric motor to adjust its torque output to achieve a target torsional resonance that causes oscillations of the first and second electric motors that are 180 degrees out of phase thereby canceling each other.

* * * * *